March 19, 1963  E. EINARSSON  3,081,970
TAKE-OFF AND LANDING FIELD FOR JET-PROPELLED AIRCRAFT
Filed Sept. 11, 1956  5 Sheets-Sheet 1

INVENTOR
EINAR EINARSSON
BY
Young, Emery & Thompson
ATTORNEYS

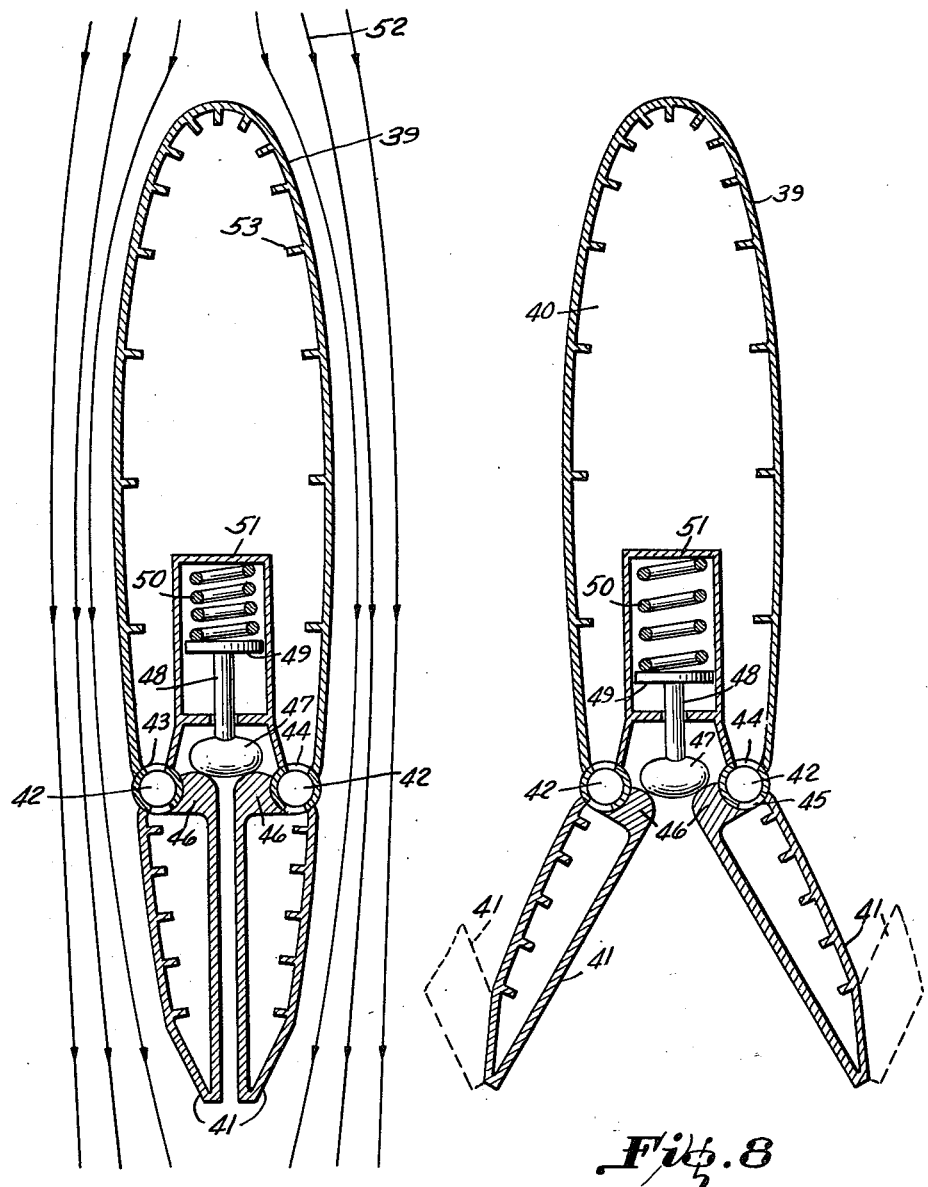

March 19, 1963  E. EINARSSON  3,081,970
TAKE-OFF AND LANDING FIELD FOR JET-PROPELLED AIRCRAFT
Filed Sept. 11, 1956  5 Sheets-Sheet 5

INVENTOR
EINAR EINARSSON

BY
ATTORNEY

United States Patent Office 3,081,970
Patented Mar. 19, 1963

3,081,970
TAKE-OFF AND LANDING FIELD FOR JET-PROPELLED AIRCRAFT
Einar Einarsson, 1071 Iranistan Ave., Bridgeport, Conn.
Filed Sept. 11, 1956, Ser. No. 609,182
8 Claims. (Cl. 244—114)

The present invention relates to an airport or take-off and landing structure or platform particularly for jet-propelled aircraft.

It is an object of the invention to provide a take-off platform or surface strip having means to absorb the heat from the jet blasts of the motors of the aircraft. Another object of the invention is to provide a platform as a grate structure having fluid conduits as heat absorbers for the supporting beams. A still further object resides in the provision of connecting the fluid- or water-containing conduits to a building or other structure, such as an aircraft hangar, for heating purposes.

Another object of the invention resides in a landing platform or grate for jet-propelled aircraft in which the grate structure includes a plurality of spaced water-cooled tubular elements or bars and of which the top most series of tubular bars are each provided with closure flaps or valves which open when a jet blast is effectively directed on the platform. It is also an object of the invention to provide the bottom surface below the platform as a liquid cooled member in which preferably water is used and circulates.

Figure 1:
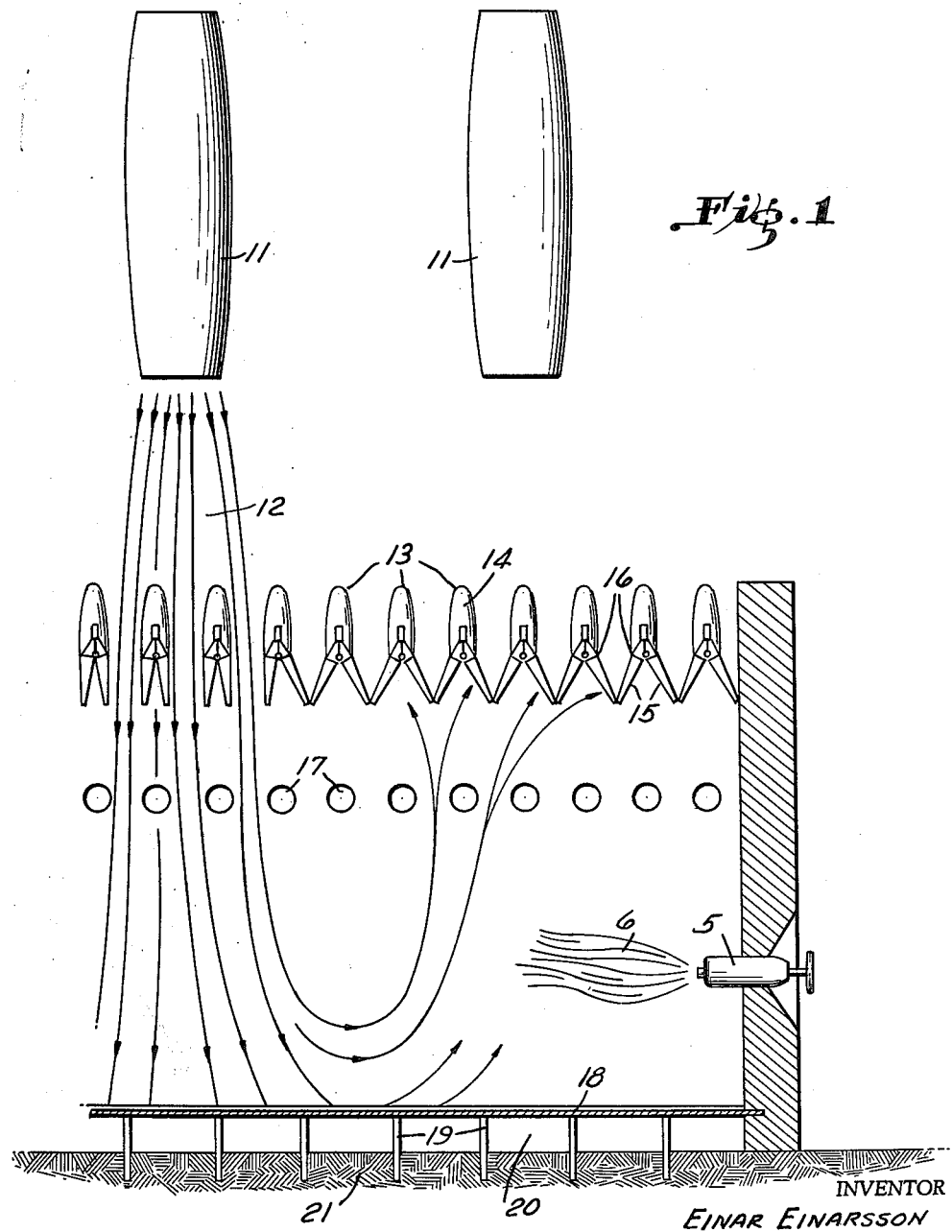
Figure 2:
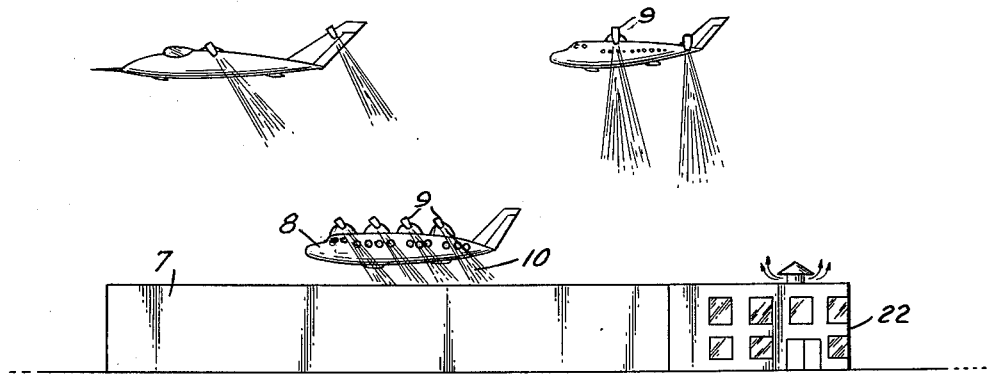
Figure 3:
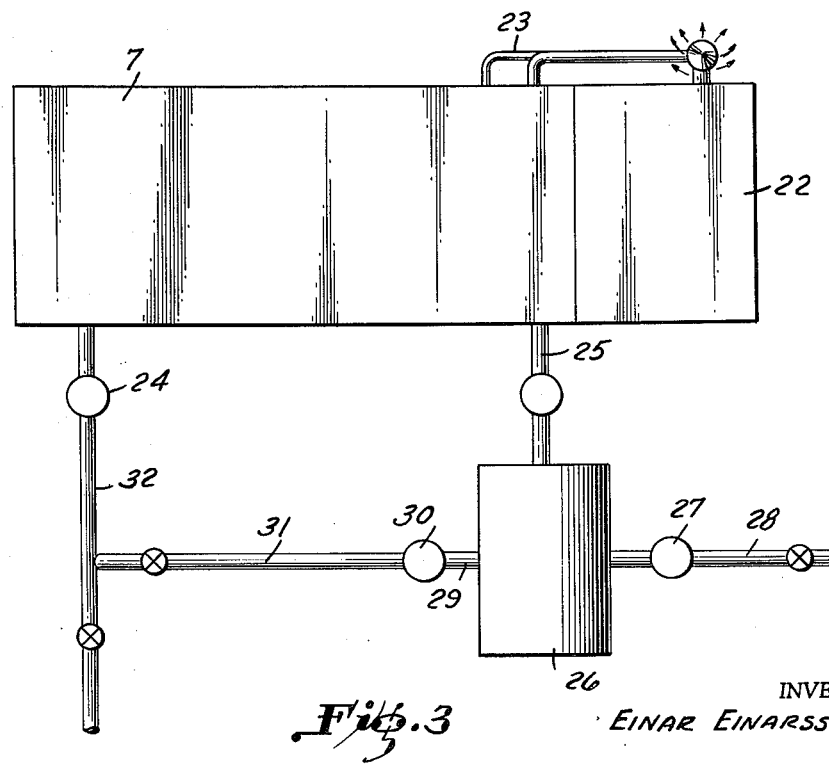
Figure 4:
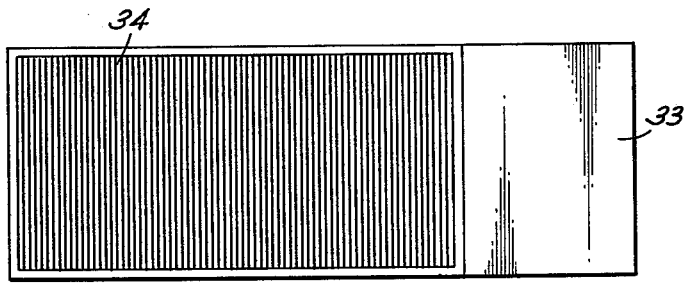
Figure 5:
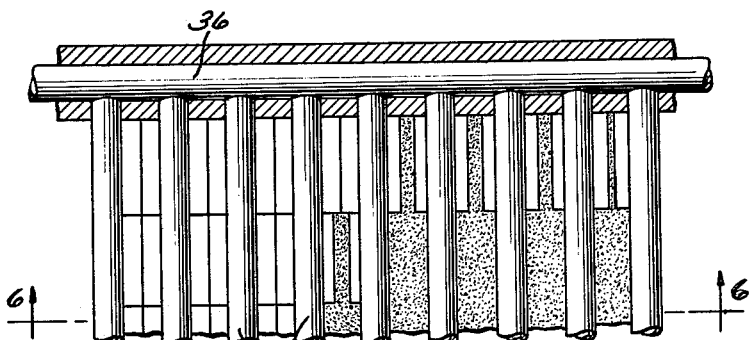
Figure 6:
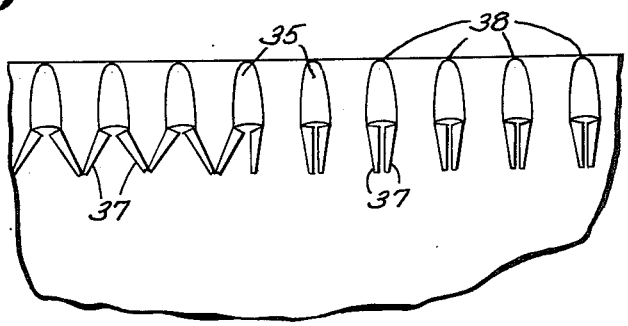
Figure 9:
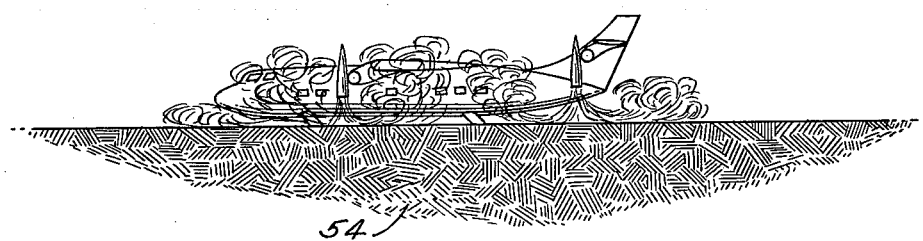
Figure 10:
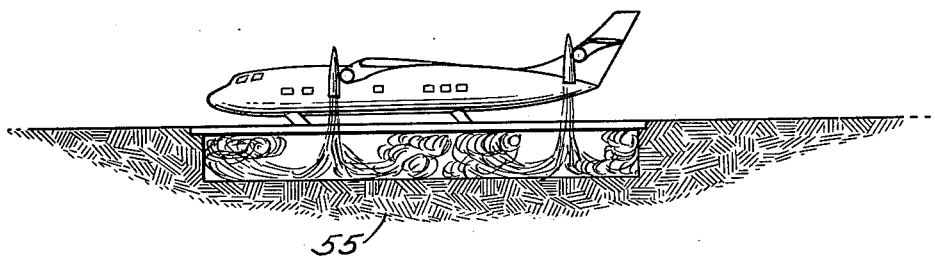

Further objects will be apparent from the following description when considered in connection with the accompanying drawings in which:

FIGURE 1 is a cross section of a portion of an airport take-off and landing structure showing diagrammatically the path of the jet streams, FIG. 2 is a side elevation of the airport take-off and landing structure with the aircraft thereabove, FIG. 3 is a diagram showing a plan view of the airport and the fluid system connected to the airport, FIG. 4 is a top plan view of the airport on a smaller scale, FIG. 5 is a detail view showing in plan the conduit water system and the thrust area of a motor, FIG. 6 is a cross section of the system taken on line 6—6 of FIG. 5, FIG. 7 is a cross section of one of the platform beams showing the flaps in open position, FIG. 8 is a cross section similar to FIG. 7 with the flaps in closed position, and FIGS. 9 and 10 are diagrammatic side elevations, partly in section showing the effective reaction of the jets from the motors.

As shown in FIG. 2, the airport 7 may comprise a landing and take-off area which may be of any suitable dimensions such as to provide a horizontal surface larger than the overall dimensions of the aircraft to be accommodated with, for example, a length of at least two aircraft and a width as large as or slightly wider than the width of the aircraft 8. Actually the size of the landing and take-off area may be chosen to suit particular conditions and in dependence upon traffic requirements.

As diagrammatically illustrated each aircraft 8 has any desired and required jet engines 9 and such engines are adjustable so that the jet 10 from each engine may be directed downwardly as illustrated or horizontally, which latter position is used when actually flying. By turning the engines 9 in the position at approximately right angles to the airport landing or take-off area the plane may rise or lower itself as desired. Thus one purpose of the invention is to so adjust a jet engine on an aircraft so that the jet blast will be directed in the desired direction to carry out the specific operational function. If now, assuming the aircraft is on the take-off area, the jet motors 11, FIG. 1, are so adjusted that the jet blast 12 is directed downwardly or vertically so that the reaction of the blast will lift the aircraft. Since the jet blast is very hot, provision is made to not only cool the gases as much as possible but to "capture" and utilize the heat in an efficient manner. Thus pipes or conduits 13 are so arranged to form a grate and each grate bar or pipe has a hollow passage 14 filled with a liquid such as water. Also each bar 13 is provided with a pair of closure plates or valves 15 each hinged at 16. Each pair of valve plates 15 is spring urged to closed position by means of spring means 50.

Below the upper series of supporting tubes 13, FIG. 1, there is preferably a second series of tubes 17 also adapted to be filled with a fluid such as water and which is spaced from the upper series of pipes. Below the second series of pipes 17 there is a bottom plate or surface 18 preferably supported on posts or columns 19 to provide a space 20 between the plate 18 and the ground 21. The space 20 may likewise be filled with a fluid such as water, and the function of the fluid in the space 20, as well as the pipes 13 and 17, is to absorb the heat from the jet blast 12.

Referring again to FIG. 2, the airport 7 may be built adjacent a building 22 which houses the waiting room and other facilities of an airport. As shown in FIG. 3 the fluid system from the airport may be connected by pipe means 23 to heat the building 22 and one or more pumps 24 may be provided, one of which is in the pipe 25 connected with a storage or assembly tank 26. A further pump 27 may provide hot water for use as desired through pipe 28 and another pipe 29 is connected to the tank 26 and a pump 30 to be conveyed to a pipe 31 to a supply pipe 32. It is of course obvious that the heat from the water in the pipes may be used for any desired purpose.

FIG. 4 shows in a top view a typical airport arrangement in which the part at the right represents a building 33 and the large section 34 is the part on which the aircraft land and take-off. The part or section 34 consists of a series of parallel pipes 35 each connected to a main pipe 36 which latter supplies water to the pipes 35. As shown in FIGS. 5 and 6 the water for cooling the tubes 35 enters the distributor pipe 36 and from there branches into the various cross tubes 35. As shown in FIG. 6 each tube 35 has a pair of hinged flaps 37 which are automatically opened when the jet blast is projected against the tubes 35 as shown for the tubes 38 in FIG. 6.

Referring to FIGS. 7 and 8 the platform beam 39 is filled with water in the interior space 40. Each beam 39 is provided with a pair of flaps 41 pivoted at 42 by means of a lug 43. Each lug 43 has a passage 44 therein so that the fluid in the space 40 may flow into its respective flap 41. Also each flap 41 has a passage 45 for the fluid and an abutment member 46, the latter being adapted to abut and contact the outer end 47 of a stem or rod 48. The inner end 49 is under the influence of a compression spring 50 mounted in a cylinder 51.

FIG. 7 shows the jet stream 52 of a jet aircraft motor flowing around the beam 39 and the force of the stream will force the flaps toward each other in contact and against the action of the spring 50. When the jet stream ceases the spring 50 will force the flaps 41 outwardly or away from each other as shown in FIG. 8 and as a matter of fact the flaps 41 will contact adjacent flaps as shown in FIG. 1. In FIG. 7 as the jet stream 52 flows past each beam 39 and past the flaps 41, the heat will to a certain extent, be absorbed into the fluid in the beam and the flaps. As pointed out the heated fluid is used for heating and other purposes.

The tube beams 13 and 39 may be made of any suitable metal or alloy such as steel and aluminum alloys and are made not only sufficiently strong to withstand the weights of the aircraft but also to withstand the effects of the heat from the jet blasts. Also such metals and metal alloys as tungsten steel, platinum or titanium may be used. Also the fluid used in the tube beams may be water with additions of antifreeze liquids or compounds when the airport is used in cold climates. In cold climates and if used on ships, it might be advantageous to keep the space below the beams 13 warm as for example by means of an oil burner 5 to produce flame jets 6, as shown in FIG. 1.

The tube beams 13 and 39 may be spaced any distance apart such as for example, from 1 to 3 inches apart or more if desired. Also any suitable supporting means for the tube beams may be used, not only for the ends of the beams but also throughout and intermediate the ends by means of suitable posts and columns, not shown. The side walls supporting the series of tube beams comprising a grate may be made of concrete, brick and stone and if necessary, asbestos fiber or sheets may be incorporated in the side walls and on the bottom plate 18.

The cooling fluid such as water may be forced through the beams 13 and 39 by pumps and of course the heat in the fluid may be used for heating and other purposes.

As shown in FIGS. 7 and 8, the internal surface of the beams 39 may be provided with short inwardly extending fins or pins 53 to obtain more cooling area. Likewise each flap 41 may be provided with cooling fins on the internal surface thereof.

The bottom portion below the platform such as for example, the plate or surface 18, will serve as a reaction surface against which the jets impinge upon landing and takeoff. This surface of course may be directly on the ground, but since the gases have first passed between the various beams 13, the jet streams are already somewhat cooled and therefore the heat is not excessive.

This airport can also be used for guided missiles and rocket propelled aircraft.

Instead of water for use as the cooling medium in the beams and the system it is possible to use sea water, oil and the like, with however water being the best and preferred fluid for cooling purposes.

FIGS. 9 and 10 illustrate the reactive effects of the gases from the jet motors in which in FIG. 9 the jets react against the surface of the ground 54 whereas in FIG. 10 the aircraft is taking off or landing on the platform with a pit therebeneath. This pit is built in the ground 55 and as shown the gases from the jet motors are directed into the pit and are dissipated therein.

If necessary the nose or upper part of each beam 39 and the outer surface of each flap 41, may be coated with an asbestos sheet or layer, not shown, to prevent the possibility of a burning action by the hot gases from the jets.

I claim as my invention:

1. A take-off and landing field for aircraft of the jet-propelled type emitting jet streams, comprising a platform composed of a plurality of spaced bars with a space thereunder and arranged to permit the jet stream to pass between the bars, each bar being hollow to receive a cooling fluid so that all the bars are fluid cooled, and a pair of flaps movably hinged to each bar to close the space between the bars by adjacent ends of the flaps of each two adjacent bars contacting each other to shut the space between adjacent bars when not forced open by the jet stream.

2. A take-off and landing field for aircraft of the jet-propelled type emitting jet streams, comprising a platform composed of a plurality of spaced bars with a space thereunder and arranged to permit the jet stream to pass between the bars, each bar being hollow to receive a cooling fluid so that all the bars are fluid cooled, a pair of flaps movably hinged to each bar to close the space between the bars by adjacent ends of the flaps of each two adjacent bars contacting each other to shut the space between adjacent bars when not forced open by the jet stream, and a spring provided between each pair of flaps of a bar to force the said pair of flaps of each bar to contacting and closed position.

3. A take-off and landing field for aircraft of the jet-propelled type emitting jet streams, comprising a platform composed of a plurality of spaced bars with a space thereunder and arranged to permit the jet stream to pass between the bars, each bar being hollow to receive a cooling fluid so that all the bars are fluid cooled, and a pair of flaps movably hinged to each bar to close the space between the bars by adjacent ends of the flaps of each two adjacent bars contacting each other to shut the space between adjacent bars when not forced open by the jet stream, each flap being hollow and being adapted to receive a cooling fluid.

4. A take-off and landing field for aircraft of the jet-propelled type emittting jet streams, comprising a platform composed of a plurality of spaced bars with a space thereunder and arranged to permit the jet stream to pass between the bars, each bar being hollow to receive a cooling fluid so that all the bars are fluid cooled, a pair of flaps movably hinged to each bar to close the space between the bars by adjacent ends of the flaps of each two adjacent bars contacting each other to shut the space between adjacent bars when not forced open by the jet stream, each flap being hollow and being adapted to receive a cooling fluid, and means in the hinge of each flap to communicate the fluid from the bar to the respective flap.

5. A take-off and landing field in the form of a platform for jet-propelled aircraft emitting jet streams, comprising a platform grate consisting of a plurality of substantially parallel beams spaced from each other and spaced from the ground to permit the jet stream to pass through the grate between the beams, said beams each being hollow to receive a heat absorbing fluid, means to force the fluid through the beams, and a pair of flaps hinged to each beam operative to close the space between adjacent beams but being adapted to open the spaces between the beams when acted on by the jets.

6. A take-off and landing field in the form of a platform for jet-propelled aircraft emitting jet streams, comprising a platform grate consisting of a plurality of substantially parallel beams spaced from each other and spaced from the ground to permit the jet stream to pass down through the grate and between the beams, said beams each being hollow to receive a heat absorbing fluid, means to force the fluid through the beams, and a pair of flaps hinged to each beam operative to close the space between adjacent beams but being adapted to open the spaces between the beams when acted on by the jets, each flap being hollow to receive the cooling fluid and having means to communicate each flap with the fluid of its respective beam.

7. A take-off and landing grate for jet-propelled aircraft emitting jet streams, comprising a plurality of spaced supporting beams arranged to absorb the heat from the jet streams as the latter pass between the beams, and having means secured to the beams to automatically close the spaces between the beams when the jet stream is not active on the grate.

8. A take-off and landing grate for jet-propelled aircraft emitting jet streams, comprising a plurality of spaced supporting beams arranged to absorb the heat from the jet streams as the latter pass between the beams, and having means secured to the beams to automatically close the spaces between the beams when the jet stream is not active on the grate, said means comprising flaps hinged to each beam and cooperating with each other as pairs from a pair of adjacent beams to move to open and closed positions.

References Cited in the file of this patent

UNITED STATES PATENTS

| | | |
|---|---|---|
| 585,053 | Stevens | June 22, 1897 |
| 742,633 | Haddock | Oct. 27, 1903 |
| 812,158 | Tuttle | Feb. 6, 1906 |
| 999,147 | Bonine | July 25, 1911 |
| 1,914,573 | Kookogey | June 20, 1933 |
| 2,512,431 | Klijzing | June 20, 1950 |
| 2,572,451 | Custer | Oct. 23, 1951 |
| 2,610,064 | Goddard | Sept. 9, 1952 |
| 2,692,024 | Burdett et al. | Oct. 19, 1954 |